Figure 1:
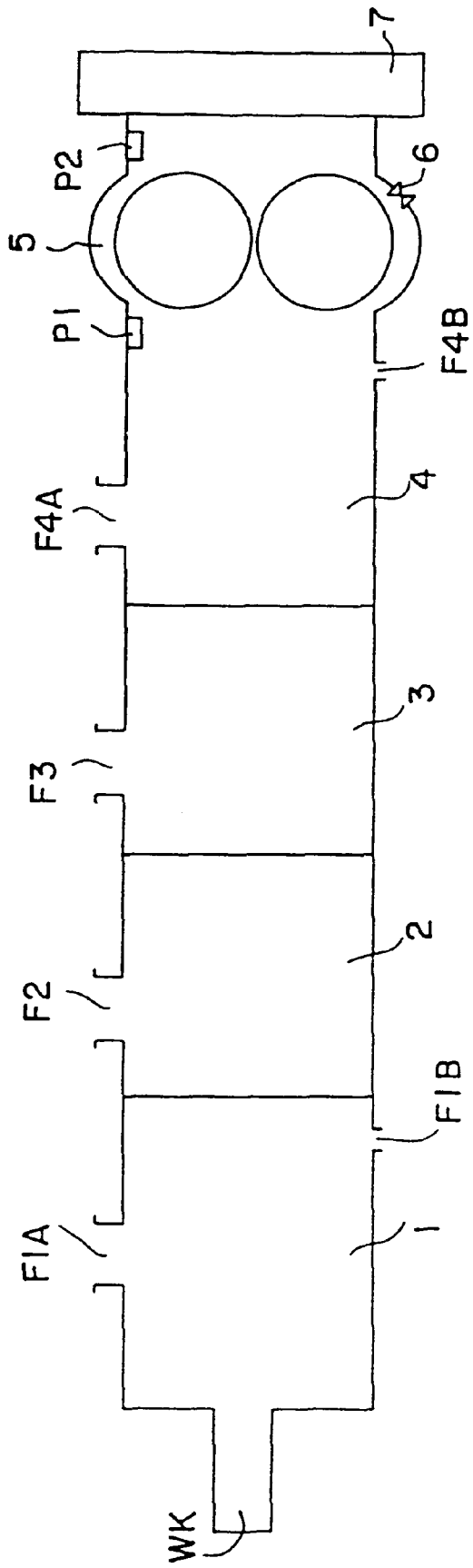

United States Patent [19]

Penfold et al.

[11] Patent Number: 6,048,935
[45] Date of Patent: Apr. 11, 2000

[54] SILANE-CROSSLINKABLE, SUBSTANTIALLY LINEAR ETHYLENE POLYMERS AND THEIR USES

[75] Inventors: John Penfold, Uetliburg, Switzerland; Morgan M. Hughes, Angleton, Tex.; Stephen Henry Cree, Terneuzen, Netherlands; Jeffery E. Brann, Lake Jackson, Tex.

[73] Assignee: The Dow Chemical Company, Midland, Mich.

[21] Appl. No.: 09/158,751

[22] Filed: Sep. 22, 1998

Related U.S. Application Data

[62] Continuation of application No. 08/718,336, Oct. 3, 1996, Pat. No. 5,824,718, which is a continuation-in-part of application No. 08/230,364, filed as application No. PCT/US95/04901, Apr. 20, 1995.

[51] Int. Cl.⁷ ....................................................... C08L 83/00
[52] U.S. Cl. .............................. 525/106; 522/120; 522/130
[58] Field of Search .............................. 525/106; 522/120, 522/130

[56] References Cited

U.S. PATENT DOCUMENTS

| | | | |
|---|---|---|---|
| 4,228,255 | 10/1980 | Fujimoto et al. | 525/288 |
| 5,272,236 | 12/1993 | Lai et al. | 526/348.5 |
| 5,824,718 | 10/1998 | Penfold et al. | 522/120 |

*Primary Examiner*—David W. Wu
*Assistant Examiner*—Caixia Lu-Rutt

[57] ABSTRACT

Curable, silane-grafted substantially linear ethylene polymers are described which are useful as wire and cable coatings, weatherstripping, fibers and the like. These silane-grafted polymers can be either filled or unfilled and cure quickly relative to many commercial coatings.

14 Claims, 2 Drawing Sheets

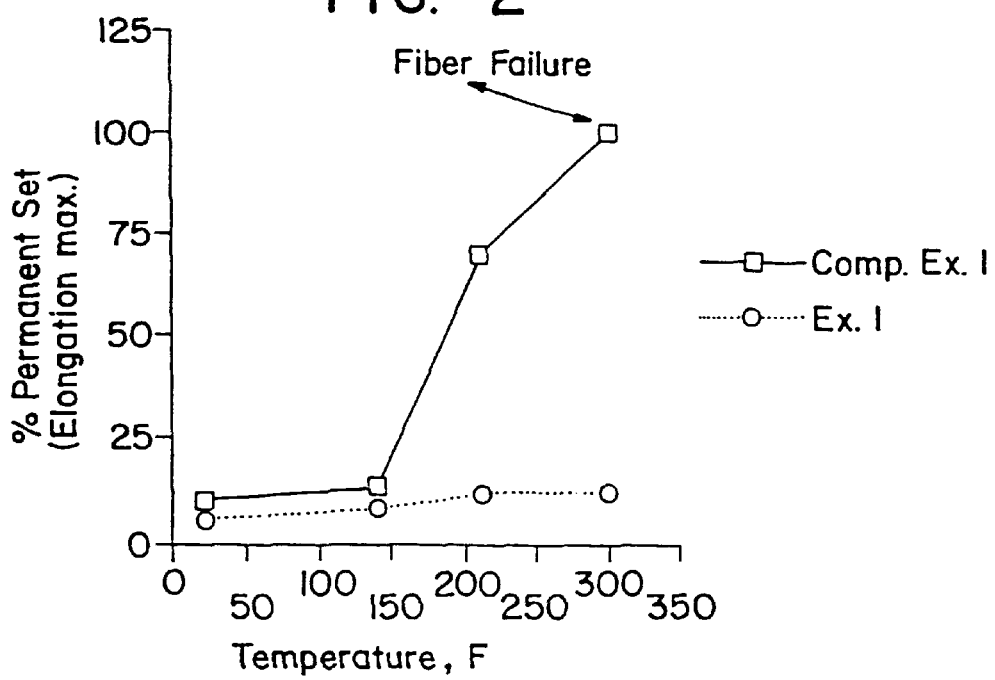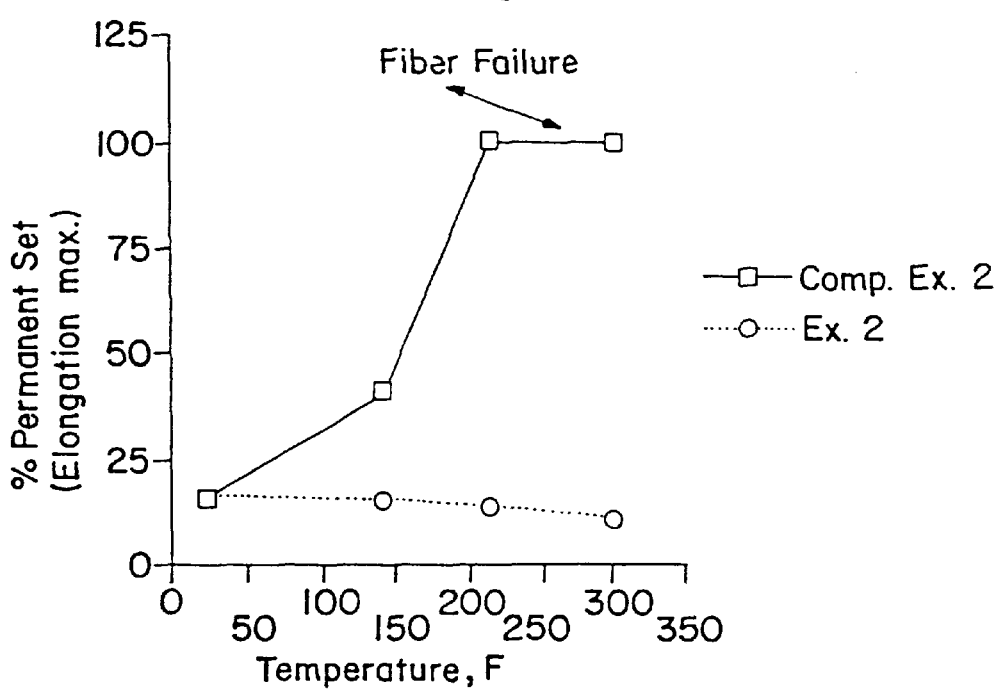

SILANE-CROSSLINKABLE, SUBSTANTIALLY LINEAR ETHYLENE POLYMERS AND THEIR USES

This application is a continuation of application Ser. No. 08/718,336 filed on Oct. 03, 1996 now U.S. Pat. No. 5,824,718, which is the U.S. national phase of International Application PCT/US95/04901 filed on Apr. 20, 1995 and which designated the U.S., which is a continuation-in-part of U.S. application Ser. No. 08/230,364 filed on Apr. 20, 1994, now abandoned.

This invention relates to ethylene polymers. In one aspect, the invention relates to substantially linear ethylene polymers while in another aspect, the invention relates to silane crosslinkable substantially linear ethylene polymers. In yet another aspect, the invention relates to the various uses of these silane crosslinkable polymers, the uses including cable insulation, weatherstripping and fibers.

For many applications, e.g. wire and cable insulation, weatherstripping, fibers, seals, gaskets, foams, footwear, tubes, pipes, bellows, tapes, etc., certain selected properties of articles manufactured from polyolefins can be enhanced by introducing chemical linkages between the polymeric molecular chains which constitute the polymer, during, or preferably following, the shaping or molding process. These chemical linkages between different polymeric molecular chains are generally known as "crosslinks". Crosslinks can be introduced between different molecular chains of a polyolefins by a number of mechanisms, one of which is to graft to the individual polymer backbones or chains that constitute the bulk polymer with a chemically reactive compound in such a manner that the grafted compound on one backgone may subsequently react with a similar grafted compound on another backbone to form the crosslink. Exemplary of this method is the "silane crosslinking" method.

Suitable silanes for the silane crosslinking process include those of the general formula

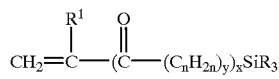

in which R' is a hydrogen atom or methyl group; x and y are 0 or 1 with the proviso that when x is 1, y is 1; n is an integer from 1 to 12 inclusive, preferably 1 to 4, and each R independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl. Such silanes may be grafted to a suitable polyolefins by the use of a suitable quantity of organic peroxide, either before or during a shaping or molding operation. Additional ingredients such as heat and light stabilizers, pigments, etc., also may be included in the formulation. In any case, the crosslinking reaction takes place following the shaping or molding step by reaction between the grafted silane groups and water, the water permeating into the bulk polymer from the atmosphere or from a water bath or "sauna". The phase of the process during which the crosslinks are created is commonly referred to as the "cure phase" and the process itself is commonly referred to as "curing".

With respect to wire and cable insulation applications, U.S. Pat. No. 4,144,202 by Ashcraft, et al., describes treeing, a phenomenon that is known to occur in olefin-based cable insulation. As here used, "cable" means all forms of electrical conductors specifically including wire and all forms of power cable, that is low, medium and high voltage cable. Ashcraft, et al. teach that treeing is a significant factor in the useful life of cable insulation, and thus in the useful life of the cable itself. As such, cable insulation typically includes a treeing inhibitor which can be either in the form of a crosslinking agent, for example, dicumyl peroxide, or in the form of a noncrosslinking agent, for example, an additive such as one of the organo silanes taught by Ashcraft, et al.

U.S. Pat. No. 5,246,783 to Spenadel, et al., describes a cable insulation comprising a polymer selected from the group consisting of ethylene polymerized with at least one comonomer selected from the group consisting of $C_3$ to $C_{20}$ α-olefins and $C_3$–$C_{20}$ polyenes, the polymer having a density in the range of 0.86 g/cm$^3$ to 0.96 g/cm$^3$, a melt index in the range of 0.2 dg/min to 100 dg/min, a molecular weight distribution in the range of 1.5 to 30, and a composition distribution breadth index greater than about 45 percent. The systems can be both filled and unfilled.

While these and other cable insulations are all useful to one extent or another, the wire and cable industry has a continuing interest in new insulation products, particularly products that enhance one or more of tree resistance, heat resistance, abrasion resistance. flexibility, cure under ambient conditions, and the like.

According to this invention, there is provided a substantially linear ethylene polymer grafted with a silane-crosslinker, the polymer, prior to being grafted with the silane, characterized as having:

(i) a melt flow ratio, $I_{10}/I_2 \geq 5.63$;

(ii) a molecular weight distribution, $M_w/M_n$, defined by the equation:

$$M_w/M_n \leq (I_{10}/I_2) - 4.63;$$

(iii) a density greater than 0.850 g/cm$^3$; and (iv) a critical shear rate at onset of surface melt fracture of at least 50 percent greater than the critical shear rate at the onset of surface melt fracture of a linear olefin polymer having about the same $I_2$ and $M_w/M_n$.

The present invention further provides a process for making the curable, substantially linear ethylene polymer grafted with a silane crosslinker, the process comprising the steps of:

A. preparing a melt of the polymer;

B. mixing into the melt of (A) at ambient temperature, between about 0.5 and about 5 phr of a silane crosslinker and C. Subjecting the melt of (B) to ionizing radiation or contacting the melt of (b) with a free radical initiator such that at least about 50 wt percent of the silane crosslinker grafts to the copolymer.

In one embodiment of this invention, the curable silane-grafted polymer is extruded as a flexible, plastic sheath about a cable to provide a cable insulation. In another embodiment of this invention, the curable silane-grafted polymer is shaped (e.g. extruded, molded, etc.) into a flexible weatherstrip, fiber, shoe sole, gasket, or the like.

FIG. 1 is a schematic representation of the extruder used in the Examples.

FIGS. 2 and 3 report the permanent set versus temperature data of selected uncrosslinked and silane crosslinked substantially linear ethylene polymers.

The substantially linear ethylene polymers used in the practice of this invention are known, and they and their method of preparation are fully described in U.S. Pat. Nos. 5,272,236 and 5,278,272, both of which are incorporated herein in their entirety by reference. As here used, "substantially linear" means that the polymer backbone is substituted with 0.01 long-chain branches/1000 carbons to 3 long-chain branches/1000 carbons, preferably from 0.01 long-chain branches/1000 carbons to 1 long-chain branch/1000 carbons, more preferably from 0.05 long-chain branches/1000 carbons to 1 long-chain branch/1000 carbons. Long-chain branching is here defined as a chain length of at least about 6 carbon atoms, above which the length cannot be distinguished using $^{13}C$ nuclear magnetic resonance spectroscopy, yet the long-chain branch can be about the same length as the length of the polymer backbone.

These unique polymers, known as "substantially linear ethylene polymers", are prepared by using constrained geometry catalysts and are characterized by a narrow molecular weight distribution and if an interpolymer, by a narrow comonomer distribution. As here used, "interpolymer" means a polymer of two or more comonomers, for example, a copolymer, terpolymer, etc., or in other words, a polymer made by polymerizing ethylene with at least one other comonomer. Other basic characteristics of these substantially linear ethylene polymers include a low residuals content (that is, low concentrations in the substantially linear ethylene polymer of the catalyst used to prepare the polymer, unreacted comonomers, and low molecular weight oligomers made during the course of the polymerization), and a controlled molecular architecture which provides good processability even though the molecular weight distribution is narrow relative to conventional olefin polymers.

While the substantially linear ethylene polymers used in the practice of this invention include substantially linear ethylene homopolymers, preferably the substantially linear ethylene polymers used in the practice of this invention comprise between about 95 and 50 weight percent (wt percent) ethylene, and about 5 and 50 wt percent of at least one α-olefin comonomer, more preferably 10 to 25 wt percent of at least one α-olefin comonomer. The comonomer content is measured using infrared spectroscopy according to ASTM D-2238 Method B. Typically, the substantially linear ethylene polymers are copolymers of ethylene and an α-olefin of 3 to about 20 carbon atoms (for example, propylene, 1-butene, 1-hexene, 4-methyl-1-pentene, 1-heptene, 1-octene, styrene, etc.), preferably of 3 to 10 carbon atoms, and more preferably these polymers are a copolymer of ethylene and 1-octene.

The density of these substantially linear ethylene polymers is at least 0.850, preferably at least 0.855 grams per cubic centimeter ($g/cm^3$), more preferably from 0.855 to 0.910 $g/cm^3$, and most preferably from 0.855 to 0.885 $g/cm^3$. The melt flow ratio, measured as $I_{10}/I_2$ (ASTM D-1238), is greater than or equal to 5.63, and is preferably from 6.5 to 15, more preferably from 7 to 10. The molecular weight distribution ($M_w/M_n$), measured by gel permeation chromatography (GPC), is defined by the equation:

$$M_w/M_n \leq (I_{10}/I_2) - 4.63,$$

and is preferably between about 1.5 and 2.5. For substantially linear ethylene polymers, the $I_{10}/I_2$ ratio indicates the degree of long-chain branching, that is, the larger the $I_{10}/I_2$ ratio, the more long-chain branching in the polymer.

The unique characteristic of these homogeneously branched, substantially linear ethylene polymers is a highly unexpected flow property in which the $I_{10}/I_2$ value of the polymer is essentially independent of the polydispersity index (that is, $M_w/M_n$) of the polymer. This is contrasted with conventional linear homogeneously branched polyolefins resins (for example, those described by Elston in U.S. Pat. No. 3,645,992) and conventional heterogeneously branched polyolefins resins (for example, those prepared with a free radical initiator, such as low density polyethylene, or those prepared with a coordination catalyst, such as linear low density polyethylene) having rheological properties such that to increase the $I_{10}/I_2$ value, then the polydispersity index must also be increased.

Substantially linear olefin polymers have a critical shear rate at onset of surface melt fracture of at least 50 percent greater than the critical shear rate at the onset of surface melt fracture of a linear olefin polymer having about the same 12 and $M_w/M_n$.

The preferred melt flow index, or simply melt index, measured as $I_2$ (ASTM D-1238, condition 190/2.16 (formerly condition E)), is from 0.5 g/10 min to 200 g/10 min, more preferably 1 to 20 g/10 min. Typically, the preferred substantially linear ethylene polymers used in the practice of this invention are homogeneously branched and do not have any measurable high density fraction, that is, short-chain branching distribution as measured by Temperature Rising Elution Fractionation (which is described in U.S. Pat. No. 5,089,321) or stated in another manner, these polymers do not contain any polymer fraction that has a degree of branching less than or equal to 2 methyls/1000 carbons. These preferred substantially linear ethylene polymers also consist of a single differential scanning calorimetry (DSC) melting peak.

An apparent shear stress vs. apparent shear rate plot is used to identify the melt fracture phenomena. According to Ramamurthy in *Journal of Rheology*, 30(2), 337–357 (1986), above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this invention, the onset of surface melt fracture is characterized at the beginning of losing extrudate gloss at which the surface roughness of extrudate can only be detected by 40× or greater magnification. The critical shear rate at onset of surface melt fracture for the substantially linear ethylene polymers of this invention is at least 50 percent greater than the critical shear rate at the onset of surface melt fracture of a linear ethylene polymer having the same $I_2$ and $M_w/M_n$. Gross melt fracture occurs at unsteady flow conditions and ranges in detail from regular (alternating rough and smooth, helical, etc.) to random distortions.

Any silane that will effectively graft to and crosslink the substantially linear ethylene polymers can be used in the practice of this invention. Suitable silanes include unsaturated silanes that comprise an ethylenically unsaturated hydrocarbyl group, such as a vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, γ-(meth) acryloxy propyl trimethoxy silane and mixtures of these silanes are the preferred silane crosslinkers for is use in this invention. If a filler is present, then preferably the crosslinker includes vinyl triethoxy silane.

The amount of silane crosslinker used in the practice of this invention can vary widely depending upon the nature of the ethylene polymer, the silane, the processing conditions, the grafting efficiency, the ultimate application, and similar factors, but typically at least 0.5, preferably at least 0.7, parts per hundred resin (phr) is used. Considerations of convenience and economy are usually the two principal limitations on the maximum amount of silane crosslinker used in the practice of this invention, and typically the maximum amount of silane crosslinker does not exceed 5, preferably it does not exceed 2, phr. As used in parts per hundred resin or phr, "resin" means the substantially linear ethylene polymer.

The silane crosslinker is grafted to the substantially linear ethylene polymer by any conventional method, typically in the presence of a free radical initiator e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is azobisisobutyl nitrite. The amount of initiator can vary, but it is typically present in an amount of at least 0.04, preferably at least 0.06, phr. Typically, the initiator does not exceed 0.15, preferably it does not exceed about 0.10, phr. The ratio of silane crosslinker to initiator also can vary widely, but the typical crosslinker:initiator ratio is between 10:1 to 30:1, preferably between 18:1 and 24:1.

While any conventional method can be used to graft the silane crosslinker to the substantially linear ethylene polymer, one preferred method is blending the two with the initiator in the first stage of a reactor extruder, such as a Buss kneader. The grafting conditions can vary, but the melt temperatures are typically between 160 and 260 C., preferably between 190 and 230 C., depending upon the residence time and the half life of the initiator.

Cure is promoted with a crosslinking catalyst, and any catalyst that will provide this function can be used in this invention. These catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

The cable insulation of this invention can be filled or unfilled. If filled, then the amount of filler present should not exceed an amount that would cause degradation of the electrical and/or mechanical properties of the silane-crosslinked, substantially linear ethylene polymer. Typically, the amount of filler present is between 20 and 80, preferably between 50 and 70, weight percent (wt percent) based on the weight of the polymer. Representative fillers include kaolin clay, magnesium hydroxide, silica, calcium carbonate. In a preferred embodiment of this invention in which a filler is present, the filler is coated with a material that will prevent or retard any tendency that the filler might otherwise have to interfere with the silane cure reaction. Stearic acid is illustrative of such a filler coating.

Other additives can be used in the preparation of and be present in the insulation of this invention, and include antioxidants, processing aids, pigments and lubricants.

The cable insulation of this invention can be applied to a cable in known amounts and by known methods (for example, with the equipment and methods described in U.S. Pat. Nos. 5,246,783 and 4,144,202). Typically, the cable insulation is prepared in a reactor-extruder equipped with a cable-coating die and after the components of the insulation are formulated, the insulation composition is extruded over the cable as the cable is drawn through the die. In a preferred embodiment of this invention in which the substantially linear ethylene polymer has an $I_2$ of about 1 to 7 g/10 min., the insulation coated onto the cable will cure in 1 to 10 days at ambient temperature.

Hallmarks of this Cable Insulation Include Improved:

1. flexibility in comparison to silane crosslinked polyolefins used for low and medium voltage insulation;
2. heat resistance in comparison to oil extended and non-oil extended peroxide vulcanised polyolefin copolymers used for flexible low voltage insulation;
3. abrasion resistance in comparison to oil extended and non-oil extended peroxide vulcanised polyolefin co-polymers used for flexible low voltage insulation; and
4. tree resistance in comparison to peroxide and silane crosslinked polyolefins used for medium voltage insulation.

In another embodiment of this invention, the silane-grafted substantially linear ethylene polymers are shaped into automotive weatherstripping. This weatherstripping is useful as a sealing system for doors, trunks, belt lines, hoods, and similar items. These materials are clear and can be processed on conventional thermoplastic equipment. In comparison, conventional sulfur-cured EPDM weatherstripping must be crosslinked in a less efficient (heat activated) process using traditional rubber (thermoset) equipment and is opaque and difficult to color match to painted surfaces.

In yet another embodiment of this invention, the silane-grafted substantially linear ethylene polymers are shaped into fibers. These fibers exhibit improved heat resistance and low shrink performance properties. These fibers are readily crosslinked upon exposure to moisture which can be effected by immersion in water or by exposure to atmospheric moisture. The permanent set elongation data shown by these crosslinked elastic fibers exhibit superior elastic behavior at elevated temperatures (e.g. 150° C.) while maintaining low shrink performance. This unique combination of elastic behavior and low shrink at elevated temperatures have utility in fabricated articles such as woven and non-woven fabric (e.g. washable clothing), elastic string (e.g. woven elastic strap), elastic filters for air/water filtration (e.g. non-woven air cleaners), and fiber matts (e.g. non-woven carpet underlayment).

The silane-grafted substantially linear ethylene polymers preferably have an α-olefin selected from the group of propylene butene, hexene, and octene, most preferably octene; and the grafted silane monomer is selected from the group including vinyl trimethoxy silane and vinyl triethoxy silane, the former more preferred. The graft modified copolymer resin has a specific gravity of less than 0.965, preferably is less than 0.91, and more preferably less than 0.88 g/cm$^3$. The fibers of this invention can be made from a single silane-grafted substantially linear ethylene polymer, or from a blend of two or more such polymers.

The following examples are illustrative of certain specific embodiments of this invention. Unless indicated otherwise, all parts and percentages are by weight.

EXAMPLE 1

Substantially linear ethylene polymer granules (1.475 kg) of ethylene and 1-octene were placed in a dry metal container. The polymer had the following properties:

Melt Flow Index ($I_2$ at 190 C., 2 kg)—1.0 g/10 min

Melt Flow Ratio ($I_{10}/I_2$)—6.8

Molecular Wt Distribution ($M_w/M_n$)—1.76 (118,000/67,000)

Density (at 25 C.)—0.87 g/cm$^3$

Melt Point (DSC)—54.9 C. (10 C./min)

Crystallization Temperature (DSC)—41.6 C. (−10 C./min)

The polymer was injected by syringe with a solution of Silfin™ 21 (23.5 g, manufactured and sold by Huels, and which contained vinyl trimethoxy silane (VTMS, 1.5 percent), dicumyl peroxide (0.07 percent), and dibutyl tin dilaurate (0.025 percent)), the container sealed, the polymer tumbled mixed for 1 hour, and then allowed to stand overnight. Upon opening of the container, the polymer was found to be dry (which is evidence that it absorbed the VTMS).

The VTMS-containing granules were fed to a 28 L/D single screw extruder operated at the conditions reported in Table 1-A. The extruder had a cavity-transfer, mixer end-section connected to a melt metering pump which controlled the volumetric flow through a slit die (10 mm×2 mm). The melted polymer was air cooled and collected as a strip. The residence time varied from 1.5 to 16 minutes.

The tensile strength and elongation at break of 11.0 MPa and 400 precent, respectively, were measured after 12 days of curing. A comparison of the rate of silane crosslink (all at equivalent levels of silane graft) with other polyolefins made in a like fashion is shown in TABLE 1-C.

TABLE 1-C

Hot Set Elongation and Modulus Comparisons of Various Polyolefins

| Resin | $I_2$ | Density (g/cm³) | percent Elongation Day | | | | | | 2 percent Modulus (MPa) |
|---|---|---|---|---|---|---|---|---|---|
| | | | 2 | 4 | 6 | 8 | 10 | 12 | |
| LDPE[1] | 2 | 0.920 | >1000 | >1000 | >1000 | 920 | 760 | 700 | 285 |
| LDPE[1] | 0.2 | 0.920 | 400 | 250 | 220 | 200 | 175 | 160 | 240 |
| ULDPE[2] | 7 | 0.912 | >1000 | 800 | 560 | 360 | 280 | 200 | 185 |
| POE* | 7 | 0.870 | 700 | 475 | 310 | 250 | 200 | 275 | 9 |
| POE* | 1 | 0.870 | 225 | 125 | 60 | 50 | 25 | 25 | 9 |

[1]Low density polyethylene
[2]Ultra low density polyethylene
*Substantially linear polymer of ethylene and 1-octene.

TABLE 1-A

Extruder Operating Conditions

| Parameter | Setting |
|---|---|
| Barrel Temp. (C.) - Zone 1 | 160 |
| Barrel Temp. (C.) - Zone 2 | 180 |
| Barrel Temp. (C.) - Zone 3 | 190 |
| Barrel Temp. (C.) - Zone 4 | 200 |
| Mixer Temp. (C.) | 200 |
| Die Adapter Temp. (C.) | 200 |
| Extruder Pres. (psi) | 13.3 |
| Extruder Amps | 2.2 |
| Screw rpm | 30 |
| Pump rpm | 22.2 |
| Residence Time (min) | 4–7 |
| Output (kg/hr) | 1 |
| Melt Temp. (C.) | 210 |

The extrudate of the silane-grafted elastomer emerging from the die had excellent hot green strength. The cooled strip, which showed no signs of blocking, was stored at 50 percent relative humidity (RH) and the Hot Set Elongation measured at 200° C. according to IEC 811-2-1. The variation of hot set elongation (which is proportional to the rate of cure) with time in days is shown in Table 1-B below:

TABLE 1-B

Hot Set Elongation of Extrudate Over Time

| Time after Grafting Days | Hot Set Elongation percent |
|---|---|
| 1 | 225 |
| 2 | — |
| 3 | — |
| 4 | 125 |
| 5 | — |
| 6 | 60 |
| 7 | — |
| 8 | 50 |
| 10 | 25 |

EXAMPLE 2.1

Substantially linear ethylene polymer granules of ethylene and 1-octene (12 mole percent) were fed continually into hopper F1 of the Buss Kneader schematically described in the Figure. The polymer had the following properties:

| | |
|---|---|
| Density (at 25 C.) | 0.870 g/cc |
| MFI ($I_2$ at 190 C., 2 kg) | 1.0 g/10 min |
| MFR ($I_{10}/I_2$) | 6.8 |
| Mol. Wt. Dist. ($M_w/M_n$) | 1.76 |
| Melt Point (DSC) | 54.9 C. (10 C./min) |
| Crystallization Temp (DSC) | 41.6 C. (−10 C./min) |

The rate of feed to the hopper was 60 kg/hr.

Referring to FIG. 1, the Buss Kneader is divided into four zones. Zone 1 is equipped with granule feed port F1A and additive port F1B, through which a mixture of silane crosslinker and peroxide initiator can be injected from a weigh cell by means of a piston pump (neither shown). Zones 2 and 3 are equipped with feed ports F2 and F3, respectively, through either of which filler can be added to the polymer from weigh cells (not shown). Zone 4 is equipped with vacuum take-off F4A and injection port F4B through which a crosslinking catalyst solution can be added to the silane-grafted polymer. Gear pump 5 is located at the distal end of Zone 4, and is equipped with diverter valve 6 for removing samples. Pressure sensors P1 and P2 are located before and after gear pump 5. At the forward end of the kneader is located screwhead WK, and at the distal end of the kneader is located crosshead and wire coating die 7.

The antioxidant masterbatch, 12 percent Vulkanox™HS (sold by Bayer AG) and 2 percent Irganox MD 1024 (sold by Ciba-Geigy) in a substantially linear ethylene polymer with the same composition and properties as the polymer of the granules, was added at 1.5 parts per hundred resin (phr) with the polyolefin granules at feed port F1A. Silfin 12 (sold by Huls AG) was injected at additive port F1B continuously at 1.62 phr (that is, 1.5 phr VTMS and 0.12 phr dicumyl peroxide). Catalyst dibutyl tin dilaurate (DBTL) in a 10 percent solution in Flexon 846 paraffin oil (sold by Exxon) was injected at 0.25 phr (0.025 phr of DBTL) at injection port F4B. The gear pump speed was 16 rpm. The temperature settings and the actual melt temperatures at the pins of the kneader are shown below in Table 2-A together with the process conditions.

TABLE 2-A

| | | | | | | | | | | | | | | | |
|---|---|---|---|---|---|---|---|---|---|---|---|---|---|---|---|
| | | | | | Temperature Settings and Pin Temperature Readings in the Buss Kneader | | | | | | | | | | |
| | Heating Zones Temp. Settings (C) | | | | Kneading Pin Temperature (C) | | | | | | | | Screw Speed | P1 | Melt Temp |
| WK* | 1 | 2 | 3 | 4 | K1 | K2 | K3 | K4 | K5 | K6 | K7 | K8 | (rpm) | (Bar) | (C) |
| 90 | 160 | 190 | 180 | 180 | 157 | 188 | 184 | 189 | 177 | 186 | 186 | 186 | 90 | 70 | 195 |

*Screw temperature

Samples of the VTMS-grafted polymer melt extruded through the diverter valve on the gear pump were taken, and immediately the melt flow index ($I_5$) at 190° C. and 5 kg was measured. At the same time, test plates (20×20×0.2 cm) were compression molded. The test plates were cured in a water bath at 90° C. for 4 hours. Hot Set Elongation IEC 540 (14) at 250° C. and the tensile strength at break according to IEC 540 were measured on test samples cut from the plate. The results are reported at Example 2.1 in Table 2-B.

EXAMPLE 2.3

Maintaining the same feed rates and extrusion conditions of Example 2, the melt pump was connected to a crosshead and cable coating die. The stranded copper conductor (2.5 mm$^2$) was run through the crosshead at 250 m/min, immediately the diverter valve on the melt pump was closed and the melt forced to flow into the crosshead and wire-coating die. The pressure on the die side of the melt pump was measured. The coated cable was collected through a 30 meter water bath (7° C.) and onto a windup reel. The processing conditions were the same as those shown on Table 2-A. Two samples of the cable were taken, one was

TABLE 2-B$^±$

Variation of Hot Set Elongation at 250° C., $I_5^+$ and Tensile Strength at Break on the Formulation for Silane Crosslinked Substantially Linear Ethylene Polymers

| | | Pump | | | | | Anti- | IEC$^1$ 540 (14) | | IEC$^2$ 540 (5) | | |
|---|---|---|---|---|---|---|---|---|---|---|---|---|
| | Output | Melt | Press | VTMS | Peroxide | DBTL$^3$ | Ox | Hot Set | Perm | | | |
| Ex. No. | Rate (kg/hr) | Temp (C) | at P$_2$ (Bar) | conc. (phr) | conc. (phr) | conc. (phr) | conc. (phr) | 250 C (%) | Set (%) | Tensile (MPa) | Elong. (%) | $I_5$ (gm/10 min) |
| 2.1 | 60 | 203 | 30 | 1.50 | 0.12 | 0.025 | 1.5 | 60 | 12 | 12.5 | 550 | 1.2 |
| 2.2 | 60 | 200 | 44 | 1.50 | 0.08 | 0.025 | 1.5 | 67 | 15 | 14.6 | 590 | 1.6 |
| 2.3 | 80 | 184 | 56 | 1.50 | 0.08 | 0.025 | 10.7 | 40.5 | 6.5 | 9.60 | 490 | N/A |
| 2.3* | 80 | 189 | 200 | 1.50 | 0.08 | 0.025 | 10.7 | 39.5 | 5.5 | 10.2 | 520 | N/A |

$^±$All reported results are typical values of at least four runs measured taken over a period of about 10 minutes.
*Cable
$^+$I$_5$ (ASTM D-1238, condition 190/5.0 (condition P))
$^1$According to IEC 811-2-1
$^2$According to IEC 811-1-1
$^3$10 percent solution in paraffin oil
N/A = not measured

EXAMPLE 2.2

A 60:40 blend of two substantially linear ethylene polymers of the same density (0.87 g/cc) and with $I_2$ (190 C., 2 kg) of 5 and 1 g/10 min, respectively, were fed at 60 kg/hr into F1A. A mixture of 1.5 phr VTMS and 0.08 phr dicumyl peroxide were injected at F1B. At F3, 1.5 phr antioxidant masterbatch (12 percent Vulkanox™ HS and 2 percent Irganox MD 1024) were added from a weigh cell. 0.25 phr of a 10 percent solution of dibutyl tin dilaurate (DBTL) were injected at F4B. The processing conditions and temperature profile are the same as those reported in Table 2-A. The polymer melt from the diverter valve 6 was sampled for melt index evaluations and the compression molding of test plates. The test plates were cured as described in Example 2. The results are reported at Example 2.2 in Table 2-B.

placed in constant Humidity Cabinet (75 RH), and it was removed every 24 hours to measure Hot Set Elongation. The second cable sample was cured in water at 85° C. for 4 hours. The results are given in Table 2-B in the row captioned "cable".

EXAMPLE 3

A 60:40 blend of two substantially linear ethylene polymers, both with a density of 0.870 g/cc and an $I_2$ of 5 and 1 g/10 min, respectively, were fed to feed port F1A at a rate of 62 kg/hr. A mixture of VTMS 0.76 phr and 1,1-di-t-butylperoxy-3,3,5-trimethyl cyclohexane was injected into the melt at F1B.

Calcium carbonate (CaCO$_3$) with a stearic acid coating (a filler) was fed into the F3 port at 35 kg/hr together with 1.5 phr of an antioxidant masterbatch containing 12 percent Vulkanox™ HS and 2 percent of Irganox® MD 1024. The melt temperature profile for the Buss kneader is shown in Table 3-A Catalyst DBTL in a 10 percent solution of paraffin Flexon® was injected at F4B into the filled VTMS grafted-melt at 0.25 phr. The CaCO$_3$-filled melt was pumped through the gear pump. Samples of the extrudate were taken for the preparation of compression-molded test plates and the measurement of $I_{10}$, the results of which are reported in Table 3-B. The molded plates were cured in a water bath at 90° C. for 4 hours, and measurements of Hot Set at 200° C. according to IEC 540 (14), tensile strength, and elongation according to IEC 811-1-1 method were made.

The melt pump was connected to the crosshead and a wire coating die carrying a copper wire of 2.5 mm$^2$. The wire speed was increased to 170 m/min and the diverter valve of the gear pump closed to feed the crosshead and the die. The pressure P1 was measured. The coated cable was cooled in a 30 meter bath, through a haul-off belt to a wind-up drum. The results of the evaluation of the coated cable are shown in Table 3-B.

5 g/10 min, an $I_{10}/I_2$ of 7.3, and a $M_w/M_n$ of 1.82 (75,000/ 41,000) were fed at 24.3 kg/hr to F1A of the Buss kneader. The temperature profile of the Buss Kneader is shown below in Table 4-A.

A mixture of VTMS (1.3 phr) and 1,1-di-t-butylperoxy-3,3,5-trimethyl cyclohexane (0.09 phr) was injected at F1B into the melt at 175 C. Magnesium hydroxide (Mg(OH)$_2$) Magnifin H10C (44 kg) (a filler) coated with stearic acid was added at feed port F2. A granular masterbatch (10.7 phr) consisting of 86 percent of a substantially linear ethylene polymer with a $I_{10}$ of 2–8 g/10 min and a density of was added at feed port F3. A tin catalyst solution (0.25 phr) is containing 10 percent of DBTL in dry triaryl phosphate was injected at F4B by a HPLC pump prior to the melt pump.

The melt temperature of the VTMS-grafted Magnifin H10C filled melt was approximately 200° C. The melt stream was sampled for the production of test plates for measuring the mechanical properties and LOI on the silane-crosslinked plates. The plates were cured in hot water at 90° C. for 4 hours.

TABLE 3-A

Processing Conditions for CaCO$_3$ (35 percent) filled Substantially Linear Ethylene Polymer

| Run No. | Heating Zones Temp. Settings (C) | | | | | Kneading Pin Temperature (C) | | | | | | | | Screw Speed | Press P$_1$ | Melt Temp |
|---|---|---|---|---|---|---|---|---|---|---|---|---|---|---|---|---|
| Position | WK* | 1 | 2 | 3 | 4 | K1 | K2 | K3 | K4 | K5 | K6 | K7 | K8 | (rpm) | (Bar) | (C) |
| 4 | 90 | 160 | 100 | 100 | 180 | 143 | 177 | 187 | 174 | 171 | 178 | 184 | 179 | 100 | 60 | 205 |
| Cable | 90 | 160 | 100 | 100 | 180 | 142 | 177 | 187 | 170 | 177 | 178 | 193 | 180 | 100 | 290 | 190 |

*Screw temperature

TABLE 3-B$^\pm$

The Variation of Hot Set Elongation, $I_{10}^+$ and Tensile Strength at Break on the Formulation and Processing Conditions for CaCO$_3$ (35 percent) filled Substantially Linear Ethylene Polymers

| | Pump | | | | | | | IEC$^1$ 540 (14) | | IEC$^2$ 540 (5) | | |
|---|---|---|---|---|---|---|---|---|---|---|---|---|
| Ex. No. | Output Rate (kg/hr) | Melt Temp (C) | Press at P$_2$ (Bar) | VTMS conc. (phr) | Peroxide conc. (phr) | DBTL$^3$ conc. (phr) | Anti-Ox (phr) | Hot Set 200 C (%) | Perm Set (%) | Tensile (MPa) | Elong. (%) | $I_{10}$ (g/10 min) |
| 3 | 100 | 206 | 60–70 | 0.76 | 0.04 | 0.025 | 1.5 | 107 | 15 | 11.1 | 696 | 0.70 |
| Cable | 100 | 196 | 290 | 0.76 | 0.04 | 0.025 | 1.5 | 90 | 15 | 9.6 | 480 | 0.30 |

$^\pm$All reported results are typical values of at least four runs measured taken over a period of about 10 minutes.
$^+I_{10}$ (ASTM D-1238, condition 190/10.0 (condition N))
$^1$Method IEC-811-2-1
$^2$Method IEC-888-1-1
$^3$10 percent Solution of DBTL

EXAMPLE 4

Granules of a substantially linear polymer of ethylene and 1-octene with a density of 0.87 g/cc, an $I_2$ (190 C., 2 kg) of The melt pump was connected to a crosshead and cable die. A coated cable was produced with a line speed of 150 m/min. The properties of the coated cable are reported in Table 4-B.

TABLE 4-A

Processing Conditions for Mg(OH)$_2$ Filled 55 percent Substantially Linear Ethylene Polymer

| Run No. | Heating Zones Temp. Settings (C) | | | | | Kneading Pin Temperature (C) | | | | | | | | Screw Speed | Press P$_1$ | Melt Temp. |
|---|---|---|---|---|---|---|---|---|---|---|---|---|---|---|---|---|
| Position | WK* | 1 | 2 | 3 | 4 | K1 | K2 | K3 | K4 | K5 | K6 | K7 | K8 | (rpm) | (Bar) | (C) |
| 5 | 60 | 160 | 100 | 100 | 160 | 117 | 171 | 169 | 155 | 173 | 180 | 162 | 180 | 120 | 50 | 189 |
| Cable | 60 | 160 | 100 | 100 | 160 | 117 | 177 | 169 | 160 | 181 | 186 | 162 | 180 | 120 | 300 | 194 |

*Screw Temperature

TABLE 4-B$^\pm$

Variation of Hot Set Elongation, I$_{10}$$^+$ and Tensile Strength at Break on the Formulation and Processing Conditions for Mg(OH)$_2$ filled Substantially Linear Ethylene Polymers

| Ex. No. | Output Rate (kg/hr) | Melt Temp (C) | Pump Press at P$_2$ (Bar) | VTMS conc. (phr) | Peroxide$^1$ conc. (phr) | DBTL$^2$ conc. (phr) | Anti-Ox (phr) | IEC 540$^3$ (14) Hot Set 200 C (%) | Perm Set (%) | IEC 540$^4$ (5) Tensile (MPa) | Elong. (%) | I$_{10}$ (g/10 min) |
|---|---|---|---|---|---|---|---|---|---|---|---|---|
| 4 | 80 | 189 | 50 | 1.30 | 0.09 | 0.025 | 10.7 | 27.5 | 15 | 9.04 | 420 | N/A |
| Cable | 80 | 194 | 300 | 1.30 | 0.09 | 0.025 | 10.7 | 26.0 | 15 | 8.90 | 390 | N/A |

$^\pm$All reported results are typical values of at least four runs measured taken over a period of about 10 minutes.
$^+$I$_{10}$ (ASTM D-1238, condition 190/5.0 (condition P))
$^1$1,1-di-tert-butyl peroxy/3,3,5 trimethyl cyclohexan
$^2$10 percent solution in tri-phenol phosphate
N/A = Not Measured
$^3$Method IEC-811-2-1
$^4$Method IEC-888-1-1

EXAMPLE 5

Fiber Extrusion Equipment and Conditions

All of the fibers were fabricated on fiber extrusion equipment consisting of an extruder, gear pump and spinneret. The extruder was used to generate a 204 C. melt. The polymer melt stream was fed to a gear pump. The gear pump was used to pressurize the molten resin in order to send it through a 200 mesh screen pack followed by a 34 hole spinneret die. The spinneret holes were 800 microns (diameter) and a 4 to 1 L/D ratio (length to diameter). The resin output from the spinneret was controlled at 0.78 grams per minute per hole. The fibers samples were quenched with room temperature air and collected as free fall fiber samples. The fibers produced from these resin were tested as described in following section.

Fiber Samples

Elastic fiber samples (Comparative Examples 5.1 and 5.2) were produced from the resins listed in TABLE 5-A. Comparative Ex. 5.1 fiber sample was prepared from ENGAGE™ EG-8150 resin (ENGAGE is a trademark of The Dow Chemical Company). Comparative Ex. 5.2 fiber sample was prepared from ENGAGE™ SM-8400 resin. These fibers were produced using the fiber extrusion equipment previously described. These elastic fibers were collected and subsequently tested for permanent set elongation as a function of temperature. These fiber are further described in TABLE 5-C.

TABLE 5-A

Polyolefin Resins

| Description/Grade | Melt Flow I$_2$ @ 190 C. | Density g/cm$^3$ |
|---|---|---|
| EG-8150 | 0.5 | 0.868 |
| SM-8400 | 30 | 0.870 |

Crosslinkable elastic fiber samples were produced from the resins listed in TABLE 5-A. These fibers were produced using the fiber extrusion equipment as described in the previous section. These resins were extruder with vinyl silane, peroxide and catalyst. The vinyl silane was supplied in an EVA resin concentrate (⅛ inch pellets). The concentrate contained approximately 40 percent vinyl trimethoxy silane, 2 percent dicumul peroxide and 0.4 percent dibutyl tin dilaurate with the balance being an EVA resin. This concentrate was obtained from OSi Corporation (Geneva, Switzerland) and was used as received. The vinyl silane resin concentrate was dry blended with each resin listed in TABLE 5-A. The amount of silane concentrate blended with the resins are shown in TABLE 5-B. These dry blends were fabricated into crosslinkable elastic fiber samples using the fiber extrusion equipment. These fibers are further described in TABLE 5-C.

The crosslinkable elastic fiber samples, as designated in TABLE 5-B, were collected and subsequently placed in 50 C. water. The corresponding comparative examples also were placed in the 50 C. water. The fibers were removed from the water after four days and subjected to permanent set elongation evaluations. The permanent set elongation test procedure used in described in the following section.

TABLE 5-B

Crosslinkable Elastic Fiber Samples

| Fiber Designation | Resin Grade and Percent (by wt.) | | Silane Concentrate Percent (by wt.) (amount blended with resin) |
|---|---|---|---|
| Ex. 5.1 | EG-8150 | 95.2 | 4.8 |
| Ex. 5.2 | SM-8400 | 90.5 | 9.5 |

The percent of vinyl trimethoxy silane in these crosslinkable elastic fibers has been calculated to be 1.9 percent (by wt.) for Ex. 5.1 and 3.8 percent (by wt.) for Ex. 5.2.

TABLE 5-C

Description of Fibers

| Fiber Designation | Fiber Diameter (inch) | percent Vinyl Trimethoxy Silane (by wt.) |
|---|---|---|
| Comparative Ex. 5.1 | 0.0311 | 0 percent (control) |
| Comparative Ex. 5.2 | 0.0105 | 0 percent (control) |
| Example 5.1 | 0.0335 | 1.9 percent |
| Example 5.2 | 0.0280 | 3.8 percent |

Shrink and Permanent Set Elongation Evaluations

The fibers were tested on an Instron tensile testing machine equipped with an environmental chamber. At the specified temperatures, a single fiber was suspended in the chamber using only the top tension grip. After 10 minutes, the amount of fiber shrinkage was determined and the bottom grip was attached to the fiber. The distance between the grips was preset to a calibrated distance of 2.54 cm. Each fiber was stretched from an original length of 2.54 cm to a final length of 5.08 cm. at a 12.7 cm/minute draw rate (i.e. grip/crosshead speed). This change in fiber length corresponds to 100 percent strain (i.e. elongation). Upon reaching a distance of 5.08 cm, the distance between the grips was returned to the original 2.54 cm setting. The amount of permanent fiber elongation was measured by monitoring the stress (i.e. load) resistance of the fiber. This elongation value was recorded as percent permanent set for the first 100 percent strain (i.e. first pull). A second 100 percent strain of the fiber was performed followed by a second percent permanent set determination for the second pull. A total of six 100 percent strain and percent permanent set determinations were obtained on each fiber at the specified temperatures. The maximum percent permanent set value for the fiber at a temperature was determined from that obtained is on the final 100 percent strain (i.e. sixth pull). Fiber failure was determined when the percent permanent set values reached or exceeded 100 percent. At this point, no further testing was conducted on the fiber. The specified temperature were 23 F., 140 F., 212 F. and 300 F.

Percent Permanent Set Data

The following data compare the permanent set values obtained on Comparative Ex. 5.1 and Ex. 5.1 fiber samples. Comparative Ex. 5.1 was prepared from EG-8150 resin. Ex. 5.1 was prepared from EG-8150 resin and vinyl trimethoxy silane.

| # of Pull | For Comp. Ex. 5.1 | For Ex. 5.1 |
|---|---|---|
| Percent Permanent Set at Temp. 23 F. | | |
| 1 | 6 | 4 |
| 2 | 8 | 4 |
| 3 | 10 | 4 |
| 4 | 10 | 5 |
| 5 | 10 | 6 |
| 6 | 10 (max.) | 6 (max.) |
| Percent Permanent Set at Temp. 140 F. | | |
| 1 | 6 | 3 |
| 2 | 9 | 4 |
| 3 | 12 | 6 |
| 4 | 14 | 8 |
| 5 | 14 | 8 |
| 6 | 14 (max.) | 8 (max.) |
| percent Permanent Set at Temp. 212 F. | | |
| 1 | 40 | 10 |
| 2 | 50 | 12 |
| 3 | 70 | 12 |
| 4 | 70 | 12 |
| 5 | 70 | 12 |
| 6 | 70 (max.) | 12 (max.) |
| percent Permanent Set at Temp. 300 F. | | |
| 1 | >100 | 8 |
| 2 | fiber failure | 10 |
| 3 | fiber failure | 12 |
| 4 | fiber failure | 12 |
| 5 | fiber failure | 12 |
| 6 | fiber failure | 12 (max.) |

These permanent set (i.e. elongation max.) data versus temperature are shown in FIG. 2.

Shrinkage Data

Comparative Example 5.1 exhibited a shrinkage value of 60 percent at 300 F.

Example 5.1 exhibited a shrinkage values of less than 5 percent at 300 F.

Perceny Permanent Set Data

The following data compare the permanent set values obtained on Comparative Ex. 5.2 and Ex. 5.2 fiber samples. Comparative Ex. 5.2 was prepared from SM-8400 resin. Ex. 5.2 was prepared from SM-8400 resin and vinyl trimethoxy silane.

| # of Pull | For Comp. Ex. 5.2 | For Ex. 5.2 |
|---|---|---|
| percent Permanent Set at Temp. 23 F. | | |
| 1 | 11 | 13 |
| 2 | 13 | 16 |
| 3 | 15 | 16 |
| 4 | 15 | 16 |
| 5 | 16 | 16 |
| 6 | 16 (max.) | 16 (max.) |
| percent Permanent Set at Temp. 140 F. | | |
| 1 | 32 | 11 |
| 2 | 34 | 13 |
| 3 | 36 | 12 |
| 4 | 38 | 14 |
| 5 | 39 | 16 |
| 6 | 40 (max.) | 15 (max.) |
| percent Permanent Set at Temp. 212 F. | | |
| 1 | >100 | 8 |
| 2 | fiber failure | 9 |
| 3 | fiber failure | 13 |

-continued

| # of Pull | For Comp. Ex. 5.2 | For Ex. 5.2 |
|---|---|---|
| 4 | fiber failure | 13 |
| 5 | fiber failure | 14 |
| 6 | fiber failure | 14 (max.) |
| percent Permanent Set at Temp. 300 F. | | |
| 1 | >100 | 8 |
| 2 | fiber failure | 9 |
| 3 | fiber failure | 10 |
| 4 | fiber failure | 11 |
| 5 | fiber failure | 11 |
| 6 | fiber failure | 11 (max.) |

These permanent set (i.e. elongation max.) data versus temperature shown in FIG. 3.

Shrinkage Data

At 300 F. Comparative Example 5.2 elongated while being suspended (no measurement possible). Example 5.2 exhibited a shrinkage values of less than 5 percent at 300 F.

The percent permanent set elongation data (FIGS. 2 and 3) show that the crosslinkable elastic fibers have elevated service temperature. The fiber shrink data show that the crosslinkable elastic fibers have superior (low) shrink performance. These performance differences are especially evident at elevated temperatures (i.e. 300 F.) where the comparative fiber examples exhibit essentially fiber failure (>100 percent permanent set elongation) and high shrink. These inferior properties limit the potential uses for substantially linear, homogeneous polymers in many fiber and fabric applications. For example, fibers which have low heat resistance and high shrink performance would have limited utility in washable/durable clothing applications. These data show that the heat resistance and shrink behavior of elastic fibers based on substantially linear, homogeneous polymers can be enhanced by utilizing a reactive extrusion/fiber fabrication process.

Although the invention has been described in considerable detail through the preceding examples, these examples are for purposes of illustration only. Many variations and modifications can be made by one skilled in the art without departing from the spirit and scope of the invention as described in the following claims.

We claim:

1. A process for making weatherstripping, the process comprising the steps of:
   A. Preparing a melt of a substantially linear ethylene polymer characterized as having:
      (i) a melt flow ratio of $I_{10}/I_2 \geq 5.63$;
      (ii) a molecular weight distribution, $M_w/M_n$, defined by the equation:

$M_w/M_n \leq (I_{10}/I_2) - 4.63$;

(iii) a density between about 0.850 and 0.91 g/cm$^3$;
      (iv) a critical shear rate at onset of surface melt fracture of at least 50 percent greater than the critical shear rate at the onset of surface melt fracture of a linear olefin polymer having about the same $I_2$ and $M_w/M_n$; and
      (v) a melt index of between 1 and 200 g/10 min;
   B. Mixing into the melt of (A) at ambient temperature, between about 0.5 and about 5 parts per hundred resin of a silane crosslinker;
   C. Subjecting the melt of (B) to ionizing radiation or contacting the melt of (B) with a free radical initiator such that at least about 50 wt % of the silane cross linker grafts to the polymer of the melt of (A);
   D. Shaping the melt of (C) into weatherstripping; and, optionally,
   E. Curing the weatherstripping.

2. A process for making a fiber, the process comprising the steps of:
   A. Preparing a melt of a substantially linear ethylene polymer characterized as having:
      (i) a melt flow ratio of $I_{10}/I_2 \geq 5.63$;
      (ii) a molecular weight distribution, $M_w/M_n$, defined by the equation:

$M_w/M_n \leq (I_{10}/I_2) - 4.63$;

(iii) a density between about 0.850 and 0.91 g/cm$^3$;
      (iv) a critical shear rate at onset of surface melt fracture of at least 50 percent greater than the critical shear rate at the onset of surface melt fracture of a linear olefin polymer having about the same $I_2$ and $M_w/M_n$; and
      (v) a melt index of between 1 and 200 g/10 min;
   B. Mixing into the melt of (A) at ambient temperature, between about 0.5 and about 5 parts per hundred resin of a silane crosslinker;
   C. Subjecting the melt of (B) to ionizing radiation or contacting the melt of (B) with a free radical initiator such that at least about 50 wt % of the silane cross linker grafts to the polymer of the melt of (A);
   D. Extruding the melt of (C) into the shape of a fiber; and, optionally,
   E. Curing the fiber.

3. The process of claim 1 in which the silane crosslinker is

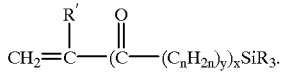

in which R' is a hydrogen atom or methyl group; x and y are 0 or 1 with the proviso that when x is 1, y is 1; n is an integer from 1 to 12 inclusive, and each R independently is selected from the group consisting of $C_1$–$C_{12}$ alkoxy, $C_1$–$C_{12}$ aryloxy, $C_1$–$C_{12}$ araloxy, $C_1$–$C_{12}$ aliphatic acyloxy, amino or substituted amino groups, and a $C_1$–$C_6$ alkyl, with the proviso that not more than one of the three R groups is an alkyl.

4. The process of claim 2 in which the silane crosslinker is

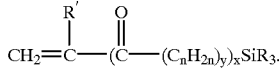

in which R' is a hydrogen atom or methyl group; x and y are 0 or 1 with the proviso that when x is 1, y is 1; n is an integer from 1 to 12 inclusive, and each R independently is selected from the group consisting of $C_1$–$C_{12}$ alkoxy, $C_1$–$C_{12}$ aryloxy, $C_1$–$C_{12}$ araloxy, $C_1$–$C_{12}$ aliphatic acyloxy, amino or substituted amino groups, and a $C_1$–$C_6$ alkyl, with the proviso that not more than one of the three R groups is an alkyl.

5. The process of claim 3 in which the silane crosslinker is present in amount between 0.5 to 5 parts per hundred ethylene polymer.

6. The process of claim 4 in which the silane crosslinker is present in amount between 0.5 to 5 parts per hundred ethylene polymer.

7. The process of claim 5 in which the ethylene polymer is a copolymer of ethylene and at least one α-olefin of 3 to 20 carbon atoms.

8. The process of claim 6 in which the ethylene polymer is a copolymer of ethylene and at least one α-olefin of 3 to 20 carbon atoms.

9. The process of claim 1 comprising curing the weatherstripping.

10. The process of claim 2 comprising curing the fiber.

11. The process of claim 1 further comprising mixing a filler into the melt of (A).

12. The process of claim 2 further comprising mixing a filler into the melt of (A).

13. The process of claim 1 further comprising mixing into the melt of step (C) between 0.015 and 0.035 phr of a crosslinking catalyst.

14. The process of claim 2 further comprising mixing into the melt of step (C) between 0.015 and 0.035 phr of a crosslinking catalyst.

* * * * *